US007245666B1

(12) United States Patent
Gardner et al.

(10) Patent No.: US 7,245,666 B1
(45) Date of Patent: Jul. 17, 2007

(54) SOFT SYMBOL DECODING FOR MIMO COMMUNICATION SYSTEMS WITH REDUCED SEARCH COMPLEXITY

(75) Inventors: James Gardner, San Ramon, CA (US); Vincent K. Jones, Redwood City, CA (US); D. J. Richard van Nee, De Meern (NL)

(73) Assignee: Qualcomm, Inc., San Diego, CA (US)

(*) Notice: Subject to any disclaimer, the term of this patent is extended or adjusted under 35 U.S.C. 154(b) by 634 days.

(21) Appl. No.: 10/408,015

(22) Filed: Apr. 3, 2003

(51) Int. Cl.
*H04B 7/02* (2006.01)
*H04L 1/02* (2006.01)

(52) U.S. Cl. ...................... 375/267; 375/262; 375/299; 375/341; 375/347

(58) Field of Classification Search ................ 375/267, 375/262, 299, 341, 347
See application file for complete search history.

(56) References Cited

U.S. PATENT DOCUMENTS 6,144,711 A * 11/2000 Raleigh et al. ............. 375/347
7,068,628 B2 * 6/2006 Li et al. ..................... 370/334
2003/0076890 A1 * 4/2003 Hochwald et al. .......... 375/264
2004/0066866 A1 * 4/2004 Tong et al. ................. 375/347

* cited by examiner

*Primary Examiner*—Dac Ha
*Assistant Examiner*—Ted M. Wang
(74) *Attorney, Agent, or Firm*—Townsend and Townsend and Crew LLP

(57) ABSTRACT

Soft symbol decoder algorithms for multiple input, multiple output (MIMO) receivers reduce the search complexity by searching over fewer than all possible combinations of transmitted symbols to compute log metrics for each transmitted bit from each transmit antenna. In one algorithm, a sub-optimal set of transmitted symbols is computed and the transmitted symbols are restricted to neighboring constellation points of the sub-optimal set. In another algorithm, all constellation points are searched for every antenna except one. In yet another algorithm, constellation points are searched excluding more than one antenna. The non-searched antenna(s) can be handled by either a bit stuffing or a soft slicing technique.

39 Claims, 6 Drawing Sheets

SOFT SYMBOL DECODING FOR MIMO COMMUNICATION SYSTEMS WITH REDUCED SEARCH COMPLEXITY

CROSS-REFERENCES TO RELATED APPLICATIONS

The present disclosure is related to co-pending U.S. patent application Ser. No. 10/068,571, filed Feb. 5, 2002, entitled "System for Soft Symbol Decoding with MIMO Log-Map Detection," which disclosure is incorporated herein by reference for all purposes.

BACKGROUND OF THE INVENTION

The present invention relates generally to multiple input, multiple output (MIMO) communication systems and in particular to soft symbol decoders for MIMO communication systems with reduced search complexity.

MIMO communication systems are known in the art. Such systems generally include a transmitter having a number ($M_t$) of transmit antennas communicating with a receiver having a number ($M_r$) of receive antennas, where $M_r$ and $M_t$ may or may not be equal. In some keying schemes, bits of data to be transmitted are grouped and each group of bits is mapped to a symbol (a particular combination of phase and amplitude) in a signaling constellation. A number of constellations are known in the art, including binary phase-shift keying (BPSK), quadrature phase-shift keying (QPSK), and quadrature amplitude modulation (QAM) constellations. In a MIMO communication system, each of the $M_t$ transmit antenna transmits, at substantially the same time, a symbol representing a different group of bits. Thus, if each symbol represents B bits, the number of bits transmitted per channel "period" is $B*M_t$.

Each receive antenna receives a signal that is a combination of signals from the transmit antennas, modified by channel properties (e.g., fading and delay) and noise. The receiver decodes (i.e., reconstructs) the $M_t$ transmitted signals from the $M_r$ received signals using its knowledge of the possible transmitted symbols and the properties of the communication channel. In some existing systems, decoding involves a "soft symbol" decoding phase and a "hard symbol" decoding phase. In the soft symbol decoding phase, possible combinations of transmitted symbols, after accounting for channel effects and noise, are compared to the received signal to generate a soft metric for each of the $B*M_t$ transmitted bits. The soft metric is a numerical value representing the relative likelihood that the transmitted bit had a value of 1 (or 0). In the hard symbol decoding phase, the soft metrics are used to generate an output data stream using algorithms such as the well-known Viterbi algorithm. Ideally, the output data stream is identical to the input data stream. In practice, there is a non-zero bit error rate that depends on a number of factors.

In conventional MIMO systems, soft metrics are generated by searching over each possible combination of constellation points. If the number of constellation points for one transmitter is C, the order, or complexity, of such a search is $C^{Mt}$. For example, in a MIMO system with two transmit antennas using a 16QAM (16-point quadrature amplitude modulation) constellation, the search order is $16^2=256$. Larger constellations and larger numbers of transmit antennas further increase the search complexity. More complex searches require more powerful processors in the receiver to keep up with the incoming data rate, which can increase the cost of the communication system.

To the extent that search complexity can be reduced, receiver architecture can be simplified, with attendant cost savings. Some examples of reduced-complexity searches are described in the above-referenced co-pending U.S. patent application Ser. No. 10/068,571. The searches described therein reduce the search complexity to $2C^{Mt-1}$.

It would be desirable to provide reduced complexity search algorithms for decoders that further reduce the search complexity without unacceptably increasing the bit error rate.

BRIEF SUMMARY OF THE INVENTION

Embodiments of the present invention provide soft symbol decoder algorithms for multiple input, multiple output (MIMO) receivers that reduce the search complexity by considering only a subset of the possible combinations of transmitted symbols and applying various completion techniques to compensate for the effects of combinations that were not considered. Search algorithms according to the present invention compute a metric (e.g., a log metric) L(k,j), which reflects the likelihood that the jth bit of the symbol transmitted by the kth transmit antenna has a value of 1 (or 0). Reducing the number of combinations considered can considerably reduce the processing requirements. Although the bit error rate for the reduced-complexity searches may be somewhat larger than that for a full search, the overall error rate is often low enough to be acceptable in many applications.

According to one aspect of the invention, soft metrics are determined in a multiple input, multiple output communication system, wherein a number $B*M_t$ of bits are transmitted in a channel period as $M_t$ symbols in a signaling constellation via a number $M_t$ of transmit antennas to a number $M_r$ of receive antennas. A received signal represented by an $M_r$-dimensional vector r is received through the communication channel. Each component of r corresponds to a signal received by a respective one of the receive antennas. An $M_t$-dimensional vector $x_{sub}$ is computed, representing a sub-optimal reconstruction of the transmitted set of symbols. For each component $x_{sub,k}$ (k=1, 2, . . . , $M_t$) of the vector $x_{sub}$, a corresponding plurality of constellation points to be searched is selected, the plurality of constellation points to be searched making up a set $X_k$ of nearest neighbor constellation points, where fewer than all of the constellation points in the signaling constellation are included in the set $X_k$. For each combination of constellation points formed by selecting a respective nearest neighbor constellation point from each of the sets $X_k$, a residual error d is computed using the received signal r and the constellation points in the combination. From the residual error d, a metric L(k,j) is computed for a transmitted bit $b_j$ sent by a transmit antenna k.

According to another aspect of the invention, soft metrics are determined in a multiple input, multiple output communication system, wherein $B*M_t$ bits are transmitted as $M_t$ symbols in a symbol constellation, one symbol per transmit antenna, to a number $M_r$ of receive antennas. A received signal represented by an $M_r$-dimensional vector r is received through the communication channel. Each component of r corresponds to a signal received by a respective one of the receive antennas. An $M_t$-dimensional vector $x_{sub}$ is computed, representing a sub-optimal reconstruction of the transmitted set of symbols. For each component $x_{sub,k}$ (k=1, 2, . . . , $M_t$) of the vector $x_{sub}$, a corresponding plurality of constellation points to be searched is selected, the plurality of constellation points to be searched making up a set $X_k$ of nearest neighbor constellation points, where fewer than all of the constellation points in the signaling constellation are included in the set $X_k$. An optimized constellation point $x_{opt1}$ is computed for a first one of the transmit antennas using the received signal r and a combination of constellation points formed by selecting one of the plurality of constellation points from the set $X_k$ for each of the transmit antennas k other than the first one of the transmit antennas. For each combination, a residual error d2 is computed from the received signal r, the optimized constellation point $x_{opt1}$, and the constellation points in the combination. From the residual error d2, a metric L(k,j) is computed for a transmitted bit $b_j$ of the symbol sent by a transmit antenna k other than the first one of the transmit antennas. In one embodiment, an optimized constellation point $x_{optM}$ is computed for a second one of the transmit antennas using the received signal r and a combination of constellation points formed by selecting one of the plurality of search points $X_k$ for each of the transmit antennas other than the second one of the transmit antennas. A residual error d1 is computed using the received signal r, the optimized constellation point $x_{optM}$, and the constellation points in the combination. From the residual error d1, a metric L(1,j) is computed for a transmitted bit $b_j$ of the symbol sent by the first one of the transmit antennas.

According to yet another aspect of the invention, soft metrics are determined in a multiple input, multiple output communication system, wherein a number $B*M_t$ bits are transmitted as $M_t$ symbols in a symbol constellation via a number $M_t$ of transmit antennas to a number $M_r$ of receive antennas. A received signal represented by an $M_r$-dimensional vector r is received through the communication channel. Each component of r is a complex number corresponding to a signal received by a respective one of the receive antennas. An optimized constellation point $x_{opt1}$ is computed for a first one of the transmit antennas using the received signal r and a combination of constellation points formed by selecting one of a plurality of constellation points $x_k$ for each of the transmit antennas k other than the first one of the transmit antennas. For each combination, a residual error d is computed using the received signal r, the optimized constellation point $x_{opt1}$, and the constellation points in the combination. From the residual error d, a metric L(k,j) is computed for a transmitted bit $b_j$ of the symbol sent by a transmit antenna k other than the first one of the transmit antennas. From the residual error d, a metric L(1,j) is also computed for a transmitted bit $b_j$ for the first one of the transmit antennas. For the first one of the transmit antennas, a stuffed constant value S is used in the computation in the event that no optimized constellation point $x_{opt1}$ has a specified bit value for the bit $b_j$.

According to a further aspect of the invention, soft metrics are determined in a multiple input, multiple output communication system, wherein $B*M_t$ bits are transmitted as symbols in a symbol constellation via a number $M_t$ of transmit antennas to a number $M_r$ of receive antennas. A received signal represented by an $M_r$-dimensional vector r is received through the communication channel. Each component of r is a complex number corresponding to a signal received by a respective one of the receive antennas. A residual value $x_{opt1}$ is computed for a first one of the transmit antennas using the received signal r and a combination of constellation points formed by selecting one of a plurality of constellation points $x_k$ for each of the transmit antennas k other than the first one of the transmit antennas. For each combination, a residual error d is computed using the received signal r, the residual value $x_{opt1}$ and the constellation points in the combination. From the residual error d, a metric L(k,j) is computed for a transmitted bit $b_j$ of the symbol sent by a transmit antenna k other than the first one of the transmit antennas. A best residual value $x_{soft}$ is selected, corresponding to a minimum value of the residual error d. From the best residual value $x_{soft}$, a metric L(1,j) is computed for each transmitted bit $b_j$ for the first one of the transmit antennas using a soft slicing procedure.

The following detailed description together with the accompanying drawings will provide a better understanding of the nature and advantages of the present invention.

DETAILED DESCRIPTION OF THE INVENTION

The following notational conventions are used in this disclosure: a capital letter in boldface type (e.g., H) represents a matrix; a lowercase letter in boldface type (e.g., r) represents a vector; and a letter in italic type (e.g., x) represents a scalar, which may be real-valued or complex-valued depending on context.

Embodiments of the present invention provide soft symbol decoder algorithms for multiple input, multiple output (MIMO) receivers that reduce the search complexity by searching over fewer than all possible combinations of transmitted symbols. To compensate for the effects of combinations that were not searched, various completion techniques are employed. Search algorithms according to the present invention compute a metric (e.g., a log metric) L(k j), which reflects the relative likelihood that the jth bit of the symbol transmitted by the kth transmit antenna has a value of 1 or 0. Such metrics can be used by various hard or soft symbol decoders, e.g., Viterbi decoders, to determine the transmitted bit sequence. Reducing the number of combinations searched can considerably reduce the processing requirements. Although the reduced-complexity searches disclosed herein may have a somewhat higher bit error rate than a full search, the overall error rate is often low enough to be acceptable in many applications.

Figure 1:
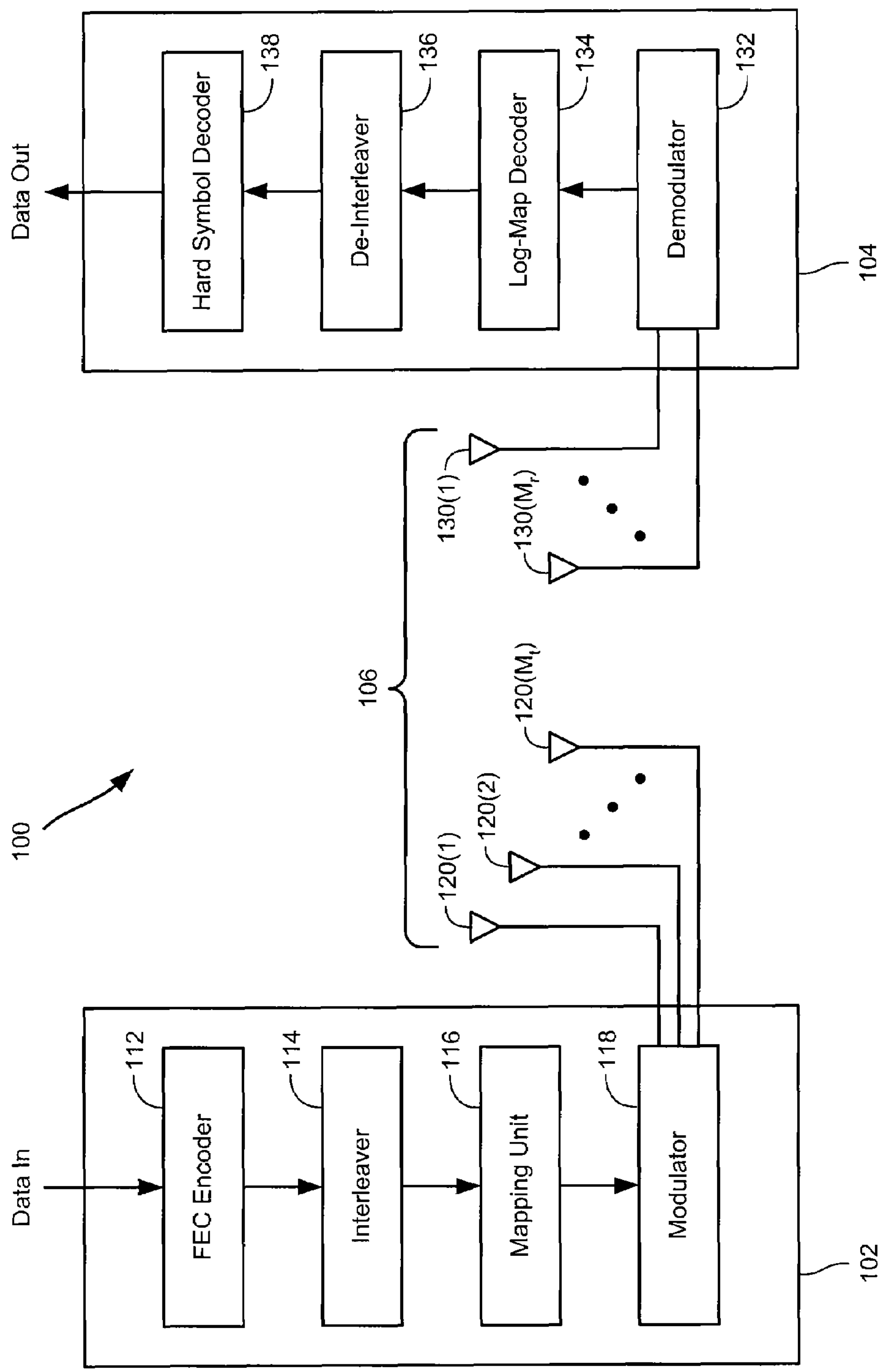
FIG. 1 is a simplified block diagram of a MIMO communication system for performing soft symbol decoding according to an embodiment of the present invention.

FIG. 1 is a simplified block diagram of a MIMO communication system 100 that implements a soft symbol decoder according to an embodiment of the present invention. MIMO communication system 100 includes a transmitter system 102 and a receiver system 104 communicating via a channel 106. Transmitter system 102 includes a forward error correction (FEC) encoder 112 for encoding an input data stream using a suitable FEC code, an interleaver 114 for grouping the input data, a mapping unit 116 for mapping grouped data to symbols in a signaling constellation, and a modulator 118 for modulating the symbols into a form suitable for transmission over channel 106 via a number ($M_t$) of transmit antennas 120. Herein, multiple instances of like objects are denoted with reference numbers identifying the object and parenthetical numbers identifying the instance where needed.

Receiver system 104 includes a demodulator 132 for demodulating a signal received via a number ($M_r$) of receive antennas 130, a log map decoder 134 for providing soft metrics in accordance with an embodiment of the present invention, a de-interleaver 136 for inverting the interleaving introduced at the transmitter, and a hard symbol decoder 138 that uses the soft metrics to generate output data. Although not shown, communication system 100 may also include other components, such as a scrambler and FFT/IFFT (Fast Fourier Transform) processing blocks. Discussion of such components is omitted as not being critical to understanding the present invention.

Communication system 100 can be implemented as an OFDM (orthogonal frequency division multiplexing) system, in which signals are split into several narrowband channels at different frequencies selected to minimize interference between the channels. In some embodiments, communication system 100 is operable in various modes, one of which is compliant with the IEEE 802.11a standard entitled "Part 11: Wireless LAN Medium Access Control (MAC) and Physical Layer (PHY) specifications, High-speed Physical Layer in the 5 GHz Band" incorporated herein by reference.

As shown in FIG. 1, input data is provided to FEC encoder 112, which encodes the data stream. One purpose of encoding, which may be done using conventional techniques, is to decrease the bit error rate in the receiver by introducing some form of redundancy into the transmitted data stream. The encoded data stream is provided to interleaver 114. Interleaver 114 groups the bits of the FEC encoder's output into groups so that each group can be directly mapped to a symbol in a signaling constellation. After interleaving, the grouped bits are provided to mapping unit 116, which maps each group of bits to a symbol in a signaling constellation. Any constellation may be used, e.g., BPSK (binary phase shift keying), QPSK (quadrature phase-shift keying), 16QAM (quadrature amplitude modulation), or 64QAM. For square constellations, a binary mapping is advantageously used. Such a mapping allows slicing to be performed in an iterative manner, as will be described below. After mapping, the symbols are modulated by modulator 118 for transmission via the $M_t$ transmit antennas 120.

The transmitted signal can be represented as an $M_t$-dimensional vector x made up of complex-valued components, where each vector component corresponds to a point in the signaling constellation. For example, if 16QAM is used and $M_t=2$, one possible transmitted signal can be represented by the vector x=(−3−i, 3−3i), corresponding to bit patterns 0001 and 1010. One vector component is transmitted by the first antenna 120(1) while the other is transmitted by the second antenna 120(2). Accordingly, the total number of bits transmitted per channel period is given by $M_t$*B, where B is the number of bits represented by each symbol. In the case of 16QAM, B=4.

At receiver 104, the transmitted signal is received, and the reverse of the transmitter process occurs to reconstruct the input data stream. The received signal can be represented as an $M_r$-dimensional vector r made up of complex-valued components, each representing a signal received by one of the receive antennas 130. In accordance with the present invention, soft symbol decoding is performed by log map decoder 134. Log map decoder 134 generates soft metrics (e.g., log metrics L(k,j)) corresponding to each transmitted bit $b_j$ ($1 \leqq j \leqq B$) of a symbol transmitted by a transmit antenna k ($1 \leqq k \leqq M_t$). The soft metrics indicate the relative likelihood of each state (0 or 1) of the transmitted bit.

In one embodiment, log map decoder 134 computes the difference for some j (between 1 and B) between the minimum distance in the complex plane from the received sample to a candidate transmitted symbol for which bit $b_j=0$ and the minimum distance from the received sample to a candidate transmitted symbol for which bit $b_j=1$. The candidate transmitted symbols are selected using reduced-complexity search algorithms that will be described below. Log map decoder 134 comprises logic circuitry that can be implemented using software, hardware or a combination of both. For example, one or more software instructions may be provided for executing the algorithms described herein. Log map decoder 134 may also be programmed with more than one search algorithm, and a selection among the available algorithms may be made depending on operating conditions, such as bit error rate, power consumption, or gate utilization requirements. For instance, log map decoder 134 can be programmed with a reduced-complexity search algorithm and a full-complexity search algorithm. The reduced-complexity algorithm is used as long as the bit error rate is below a certain threshold; if the error rate exceeds the threshold, log map decoder 134 switches to the full complexity algorithm. Log map decoder 134 can also be programmed to use the reduced-complexity algorithm when reduced power consumption is desired, or under any other suitable combination of operating conditions.

The soft metrics generated by log map decoder 134 are provided to a hard symbol decoder 138, which implements an algorithm for determining the most likely input data stream from a set of soft metrics for the received signal. Various algorithms, such as a conventional Viterbi algorithm, can be implemented. A discussion of such algorithms is omitted as not being critical to understanding the present invention.

In the MIMO communication systems used in the present invention, there can be a large number of possible candidate transmissions. For example, where $M_t=2$ and each component of the transmitted vector is modulated using the 16QAM constellation, there are $16^2=256$ possible transmissions. In general, there are $C^{Mt}$ possible transmissions, where $C=2^B$ is the number of points in the signaling constellation.

Receiver 104 also includes additional circuitry (not shown) for determining channel estimates characterizing signal propagation between each transmitter and each receiver, as well as noise power in the system. As is known in the art, channel estimates can be represented using an $M_r \times M_t$ matrix H with complex-valued components, where r=Hx holds to the extent that the channel estimates are accurate and no other noise exists. Noise power can be represented using an $M_r \times M_r$ matrix A with complex-valued components. Channel estimates and noise power estimates may be generated using a variety of methods, including standard techniques known in the art. A discussion of specific techniques for generating channel estimate matrix H and noise power matrix A is omitted as not being critical to an understanding of the present invention.

It is to be understood that the MIMO communication system described herein is illustrative and that variations and modifications are possible. Any number of transmit antennas $M_t$ and any number of receive antennas $M_r$ may be provided, and it is not required that $M_t$ and $M_r$ be equal. The design of various system components, as well as methods used for forward error correction, interleaving, and modulation can be varied.

A reduced-complexity search algorithm according to a first embodiment of the present invention will now be described. In this embodiment, log map decoder 134 implements a nearest neighbor search algorithm, in which only a subset of constellation points is searched for each antenna.

Figure 2A:
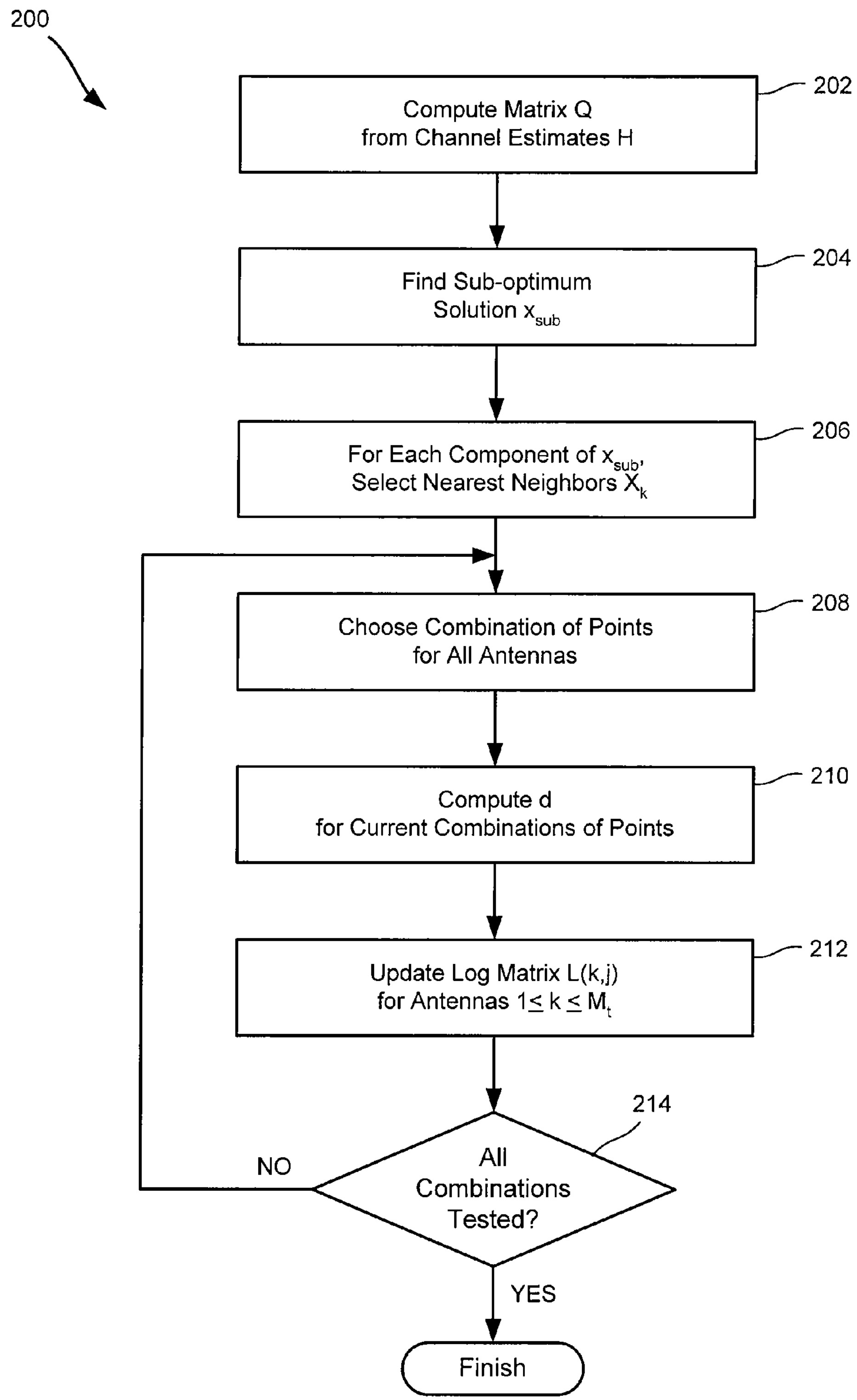
FIGS. 2A-2B are flow charts of processes for soft symbol decoding using a nearest neighbor search according to embodiments of the present invention.

FIG. 2A is a flow chart of an exemplary embodiment of a nearest neighbor search process 200. At step 202, a matrix Q (of dimensions $M_t \times M_r$) is computed from the channel estimates H. The matrix Q is defined as:

$$Q=(H^*H)^{-1}H^*, \tag{1}$$

where H* is the complex-conjugate of H.

At step 204, a "sub-optimum" vector $x_{sub}$ of transmitted constellation points in the Euclidean, or two-norm, sense is found. In other embodiments, non-Euclidean metrics might be used instead. Specifically, $x_{sub}$ is given by:

$$x_{sub} = \underset{x}{\mathrm{argmin}}[(Qr-x)^\dagger(Qr-x)], \tag{2}$$

where r is the $M_r$-dimensional vector of received data signals, $(\ )^\dagger$ denotes the Hermitian transpose, the minimum is taken over all possible transmitted vectors x, and "arg" returns the value of x that results in the minimized value. Equation (2) reduces to $M_t$ independent equations of the form:

$$x_{sub,k} = \underset{x_k}{\mathrm{argmin}}((Qr)_k - x_k), \tag{3}$$

where $(Qr)_k$ is the kth component of the vector Qr and $x_{sub,k}$ is the kth component of $x_{sub}$.

These $M_t$ equations are preferably solved without searching over all constellation points. This can be done using "slicing" procedures based on the signs of the real and/or imaginary components of $(Qr)_k$. For instance, if a binary phase-shift keying (BPSK) constellation is used, the constellation points are at +1 and −1 (in appropriate units of amplitude), and the sign of the real part of $(Qr)_k$ determines which point is closer. If a quadrature phase-shift keying (QPSK) constellation is used, the constellation points are at 1+i, −1+i, −1−i, and 1−i. In this case, the signs of the real and imaginary parts of $(Qr)_k$ determine the nearest one of the four constellation points. In the case of 16QAM, the signs of the real and imaginary parts of $(Qr)_k$ are used to select a quadrant, narrowing the number of candidate constellation points to four. $(Qr)_k$ is then shifted by a quadrant-specific offset so that each of the four remaining candidate constellation points is in a different quadrant. The signs of the real and imaginary components of the shifted value are used to select one of the four candidate points. Similar techniques of quadrant selecting and shifting (referred to herein as "slicing") can also be used to select a closest point within other constellations, without computing $(Qr)_k-x_k$ for any constellation points $x_k$.

It will be appreciated that the mapping of bits to symbols can be chosen such that each successive quadrant selecting operation corresponds to different bits in the transmitted data. For instance, in the case of 16QAM (four bits per symbol) with an appropriate mapping, selecting a quadrant corresponds to selecting values for the first two bits; the second selection within the quadrant corresponds to selecting the last two bits.

Figure 3:
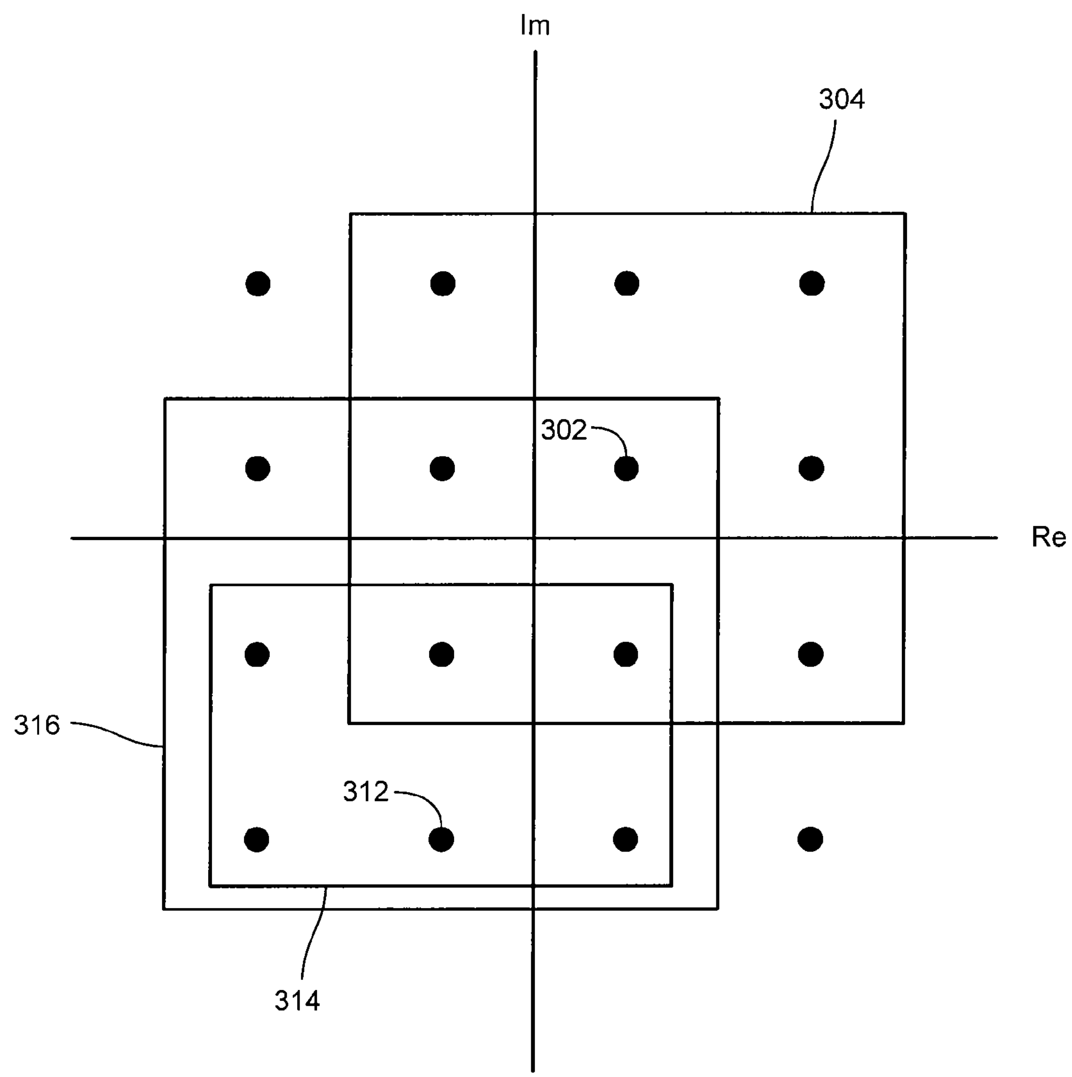
FIG. 3 is a graph showing nearest neighbor points for a constellation point according to an embodiment of the present invention.

After $x_{sub}$ is determined, a number ($N_s$) of nearest-neighbor constellation points are selected for each transmit antenna (step 206). That is, for each transmit antenna k, a set $X_k$ is generated, comprising the sub-optimum point $x_{sub,k}$ and $N_s-1$ other points that are closest to $x_{sub,k}$ in the Euclidean sense. An example is shown in FIG. 3 for the case of 16QAM. In this example, the sub-optimum constellation point $x_{sub,k}$ for a transmit antenna k is point 302. The constellation points inside box 304 are the elements of set $X_k$ for the constellation point 302 in the case where $N_s=9$. It will be appreciated that, since the signaling constellation is identified at the outset, a lookup table containing the points to be included in set $X_k$ for each constellation point can be generated and stored in memory accessible to log map decoder 134. Accordingly, step 206 can be implemented using a table lookup operation. In the case where the sub-optimum point $x_{sub,k}$ is an edge point of the constellation (e.g., point 312), the lookup table can either include fewer neighbor points (e.g., the points inside box 314) or include $N_s$ points by including more distant constellation points (e.g., the points inside box 316). It should be noted that the latter option advantageously provides constant array sizes and search times.

A search over combinations of the nearest neighbor points is then performed to determine log metrics L(k,j) for every transmit antenna k. To determine the log metrics, all possible combinations of elements of the sets $X_k$ for all antennas ($1 \leqq k \leqq M_t$) are searched. If there are $N_s$ constellation points in each set $X_k$, then there are $N_s^{Mt}$ combinations to be searched. At step 208, one of these combinations is selected.

At step 210, a residual error d for the current combination is calculated using the equation:

$$d = \left(r - \sum_{k=1}^{M_1} h_k \hat{x}_k\right)^{+} \Lambda^{-1} \left(r - \sum_{k=1}^{M_1} h_k \hat{x}_k\right). \tag{4}$$

where $\hat{x}_k$ is the element of set $X_k$ that is part of the current combination, Λ is the noise power matrix and $h_k$ is a channel estimate vector for the channel from the kth transmit antenna to each receive antenna (i.e., the kth column of channel estimate matrix H).

At step 212, log metrics L(k,j) are computed for each transmitted bit $b_j$ from each transmit antenna k. Specifically, the log metrics are defined as:

$$L(k, j) = \min_{\hat{x}_k | b_j=1} d - \min_{\hat{x}_k | b_j=0} d, \tag{5}$$

where, for the kth antenna, the first term in equation (5) denotes the minimum value of d over all constellation points $\hat{x}_k$ in the set $X_k$ for which the jth bit ($b_j$) is equal to 1, and the second term denotes the minimum value of d over all constellation points $\hat{x}_k$ in the set $X_k$ for which $b_j$ is equal to 0. It should be noted that all of the log metrics for each antenna k can be determined by computing d just once for each combination. More specifically, a "best" value of the residual error d for each transmitted bit (k,j) can be stored for both the $b_j=0$ and $b_j=1$ cases and updated if the value of d for the current combination of constellation points is less than the best value. Thus, in one embodiment, step 212 is implemented such that each time a value of d is computed, a loop over each transmitted bit $b_j$ for each antenna k is executed to compare the appropriate best value (i.e., the best value for either $b_j=0$ or $b_j=1$, depending on the current $\hat{x}_k$) to the current value and update the best value as needed.

Because not all constellation points are considered for antenna k, there could be a case where none of the constellation points in the set $X_k$ for one of the antennas has a particular bit equal to 1 (or a particular bit equal to 0). In such a case, the minimum value of d in equation (5) is replaced with a "stuffed" constant value S. That is, if there is no case where $b_j=0$, then:

$$L(k, j) = \min_{\hat{x}_k | b_j = 1} d - S, \tag{6}$$

and if there is no case where $b_j=1$, then:

$$L(k, j) = S - \min_{\hat{x}_k | b_j = 0} d. \tag{7}$$

In some embodiments, the stuffed value S is used as an upper bound on d; that is, if d is greater than S for every combination, then the value S is used instead of the minimum value of d. Accordingly, updating of the log metrics can be implemented by initializing the best values for each transmitted bit (k,j) to S and then updating the best value if the value of d2 for the current combination is less than the stored best value, as described above. It should be noted that S is advantageously chosen to have a moderately large value so that the log metric is not strongly biased by it.

At step 214, it is determined whether all combinations of nearest-neighbor points $\hat{x}_k$ have been tested. If not, the process returns to step 208 to select the next combination. Otherwise, process 200 exits. The set of log metrics L(k,j) for all $M_t$ antennas is provided to hard symbol decoder 138 (e.g., a Viterbi decoder), which uses the log metrics to reconstruct the input data stream. The search complexity for process 200 is $N_s^{Mt}$, which is generally less than the full-search complexity ($C^{Mt}$) because not all points are searched.

Figure 2B:
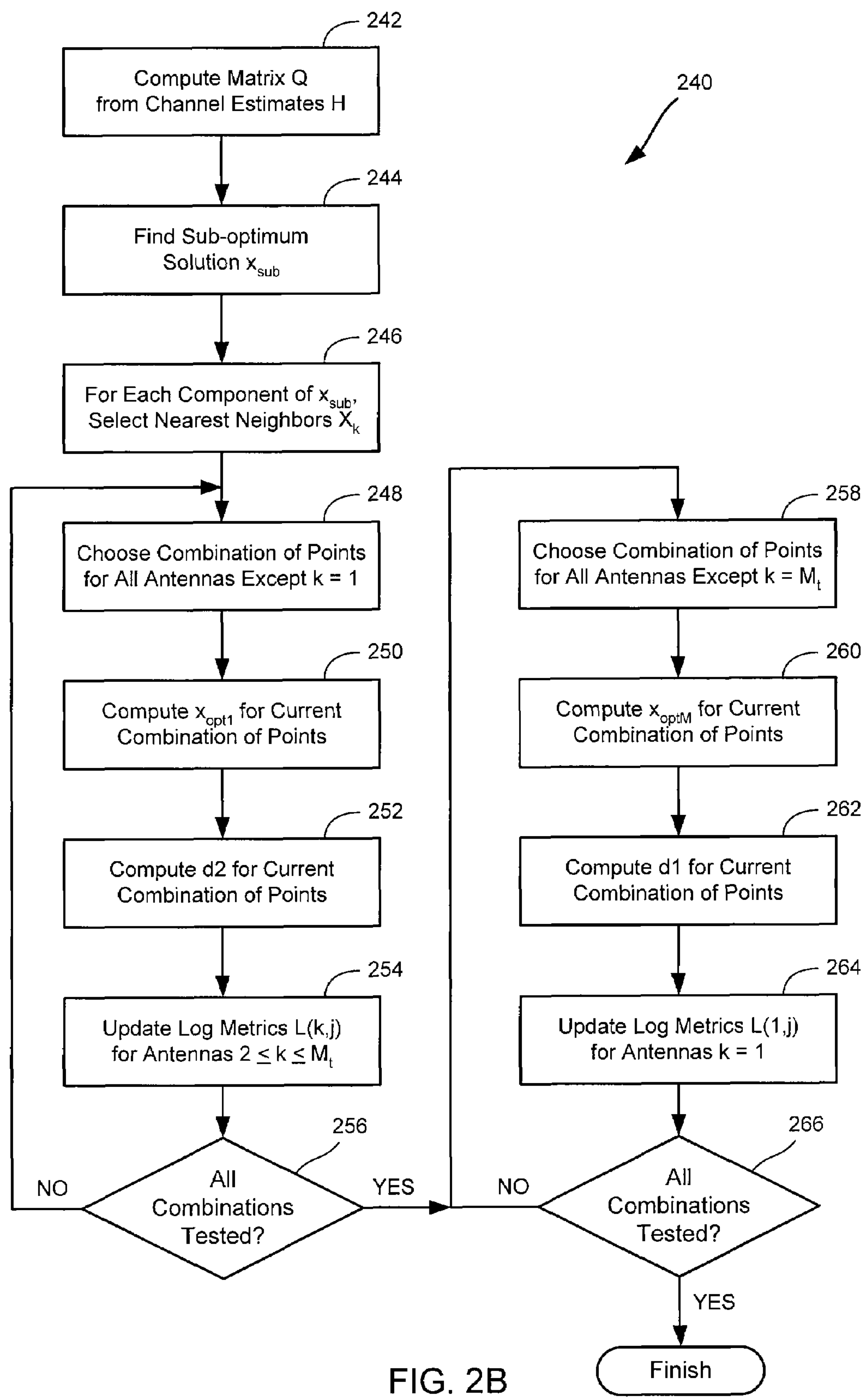

An alternative embodiment of a nearest neighbor search process 240 is shown in FIG. 2B. In this embodiment, the search complexity is further reduced by excluding one of the transmit antennas from the nearest neighbor search, then performing a second search that excludes a different one of the transmit antennas.

The initial steps correspond to steps 202, 204 and 206 of process 200. This is, at step 242, a matrix Q, defined according to equation (1), is computed from the channel estimates H. At step 244, a sub-optimum vector $x_{sub}$ of transmitted constellation points, defined according to equation (2) is found. At step 246, a number ($N_s$) of nearest-neighbor constellation points are selected for each transmit antenna.

A search over combinations of the nearest neighbor points is then performed to determine log metrics L(k,j) for every transmit antenna k except one. In the examples herein, the excluded antenna is denoted by k=1, but this is not tied to any particular arrangement of transmit antennas, and any one of the antennas may be excluded. To determine the log metrics, all possible combinations of elements of the sets $X_k$ for antennas $2 \leqq k \leqq M_t$ are searched. If there are $N_s$ constellation points in each set $X_k$, then there are $N_s^{Mt-1}$ combinations to be searched. At step 248, one of these combinations is selected, and at step 250, a constellation point $x_{opt1}$ for the first transmit antenna is computed using the equation:

$$x_{opt1} = \text{slice}\left( \frac{h_1^* \Lambda^{-1} r - \sum_{k=2}^{M_1} h_1^* \Lambda^{-1} h_k \hat{x}_k}{h_1^* h_1} \right), \tag{8}$$

where $\hat{x}_k$ is the element of set $X_k$ that is part of the current combination, $\Lambda$ is the noise power matrix and $h_k$ is a channel estimate vector for the channel from the kth transmit antenna to each receive antenna (i.e., the kth column of channel estimate matrix H). The slice operation in equation (8) selects the nearest valid constellation point in the Euclidean sense, so that $x_{opt1}$, is restricted to constellation points, although the constellation point $x_{opt1}$ is not required to be an element of the nearest neighbor set $X_1$. The implementation of this operation can be similar to the slicing operation described above for determining $x_{sub,k}$ (step 204 of process 200).

At step 252, a residual error d2 for the current combination is calculated using the equation:

$$d2 = \left( r - h_1 x_{opt1} - \sum_{k=2}^{M_1} h_k \hat{x}_k \right)^+ \Lambda^{-1} \left( r - h_1 x_{opt} - \sum_{k=2}^{M_1} h_k \hat{x}_k \right). \tag{9}$$

At step 254, log metrics L(k,j) for each transmitted bit $b_j$ from each transmit antenna k except the first (k=1) are updated. Similarly to process 200, the log metrics are defined as:

$$L(k, j) = \min_{\hat{x}_k | b_j = 1} d2 - \min_{\hat{x}_k | b_j = 0} d2, \tag{10}$$

where, for the kth antenna, the first term in equation (10) denotes the minimum value of d2 over all constellation points $\hat{x}_k$ in the set $X_k$ for which the jth bit ($b_j$) is equal to 1, and the second term denotes the minimum value of d2 over all constellation points $\hat{x}_k$ in the set $X_k$ for which $b_j$ is equal to 0. As described above with regard to step 212 of process 200, all of the log metrics for each antenna $k (2 \leqq k \leqq M_t)$ can be determined by computing d2 just once for each combination.

Also as described above, because not all constellation points are considered for antenna k, there could be a case where none of the constellation points in the set $X_k$ for one of the antennas has a particular bit equal to 1 (or a particular bit equal to 0). In such a case, the minimum value of d2 in equation (10) is replaced with a "stuffed" constant value S. That is, if there is no case where $b_j=0$, then:

$$L(k, j) = \min_{\hat{x}_k | b_j = 1} d2 - S, \tag{11}$$

and if there is no case where $b_j=1$, then:

$$L(k,j) = S - \min_{\hat{x}_k|b_j=0} d2. \quad (12)$$

In some embodiments, the stuffed value S is used as an upper bound on d2, as described above. It should be noted that S is advantageously chosen to have a moderately large value so that the log metric is not strongly biased by it.

At step 256, it is determined whether all combinations of nearest-neighbor points $\hat{x}_k$ for the antennas other than the first have been tested. If not, the process returns to step 248 to select the next combination.

After all combinations of nearest neighbor points for antennas other than the first have been searched, a similar sequence of steps is executed to compute log metrics L(1,j) for each transmitted bit $b_j$ from the first transmit antenna. This time, a different one of the transmit antennas is excluded from the search. The second excluded antenna is identified herein as $k=M_t$, but this is not tied to any particular arrangement of transmit antennas, and any antenna (other than the one that was excluded from the first search) may be excluded. At step 258, one of the elements of the set $X_k$ is chosen for each antenna $1 \leqq k \leqq M_t-1$. If there are $N_s$ constellation points in each set $X_k$, then there are $N_s^{Mt-1}$ possible combinations to be tested. At step 260, a constellation point $x_{optM}$ is computed for the $M_t$th transmit antenna using the equation:

$$x_{optM} = \text{slice}\left(\frac{h_{Mt}^* \Lambda^{-1} r - \sum_{k=1}^{M_t-1} h_{Mt}^* \Lambda^{-1} h_k \hat{x}_k}{h_{Mt}^* h_{Mt}}\right). \quad (13)$$

At step 262, a residual distance d1 is computed using the equation:

$$d1 = \left(r - h_{Mt} x_{optM} - \sum_{k=1}^{M_t-1} h_k \hat{x}_k\right)^{\dagger} \Lambda^{-1} \left(r - h_{Mt} x_{optM} - \sum_{k=1}^{M_t-1} h_k \hat{x}_k\right). \quad (14)$$

At step 264, this residual distance d1 is used to determine log metrics L(1,j) for the first antenna using the equation:

$$L(1,j) = \min_{\hat{x}_1|b_j=1} d1 - \min_{\hat{x}_1|b_j=0} d1. \quad (15)$$

As with the other antennas, a stuffed constant value S may be applied in the case where no searched constellation point $\hat{x}_1$ has $b_j=1$ (or 0) for a particular bit position j.

At step 266, it is determined whether all combinations have been tested. If not, the process returns to step 258 to select the next combination. Otherwise, process 240 exits. The full set of log metrics L(k,j) for all $M_t$ antennas is provided to hard symbol decoder 138 (e.g., a Viterbi decoder), which uses the log metrics to reconstruct the input data stream.

In process 200, search complexity is reduced to $N_s^{Mt}$ by limiting the number of constellation points searched for each antenna to $N_s$ (rather than the full number of constellation points C). Process 240 achieves a further reduction by performing two searches, with one antenna excluded from each search. The search order for process 240 is $2N_s^{(Mt-1)}$, as compared to $C^{Mt}$ for the full search.

The reduction in complexity is traded off against an increased error rate. The performance penalty depends on the number of points searched ($N_s$), as well as on other system conditions. For instance, for process 240 in a MIMO system in which $M_t=2$, $M_r=2$, the 64QAM constellation is used, and $N_s=21$, the performance penalty under moderate channel delay spread conditions is approximately 2 dB relative to the full complexity search. The performance is adequate for many applications.

It will be appreciated that processes 200 and 240 are illustrative and that process steps may be modified, varied, or combined. The number of constellation points $N_s$ to be searched may be varied. In some embodiments, the value of $N_s$ is automatically selected and adjusted based on operating system conditions such as bit error rate, power consumption, and gate utilization. The set of neighbor points for a constellation point may be selected in any desired manner; the boxes depicted in FIG. 3 are illustrative and not restrictive. In process 240, any two transmit antennas may be selected to be excluded from the searches; use of the indices 1 and $M_t$ to denote the excluded antennas is merely a notational convenience.

Figure 4:
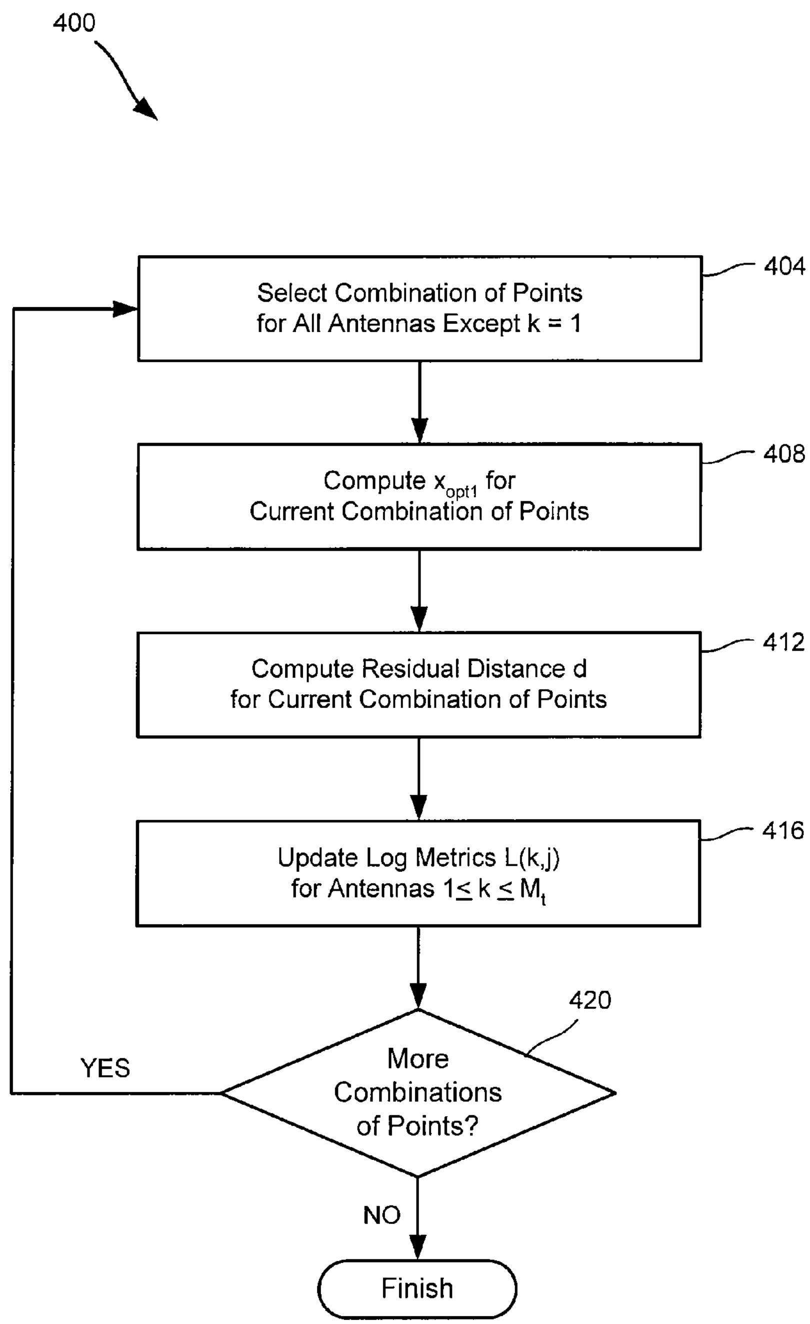
FIG. 4 is a flow chart of a process for soft symbol decoding using bit stuffing completion according to another embodiment of the present invention.

FIG. 4 illustrates a reduced-complexity search process 400 according to another embodiment of the present invention. In this embodiment, log map decoder 134 implements a "bit-stuffing" completion algorithm that generates log metrics for all combinations of bit values based on a single search over all possible constellation points for all antennas except one. For the excluded antenna, in any case where a bit value for one of the bits $b_j$ never occurs, a constant value is "stuffed" into the log metric to complete the computation.

More specifically, at step 404, a combination of possible constellation points $x_k$ for the k−1 antennas numbered 2 through $M_t$ is selected. At step 408, a corresponding constellation point $x_{opt1}$ for the remaining antenna (k=1) is determined using the formula:

$$x_{opt1} = \text{slice}\left(\frac{h_1^* \Lambda^{-1} r - \sum_{k=2}^{M_t} h_1^* \Lambda^{-1} h_k x_k}{h_1^* h_1}\right), \quad (16)$$

where the slice operation selects the nearest constellation point in the Euclidean sense. This operation can be implemented as described above.

At step 412, a residual error d is computed for the current combination using the formula:

$$d = \left(r - h_1 x_{opt1} - \sum_{k=2}^{M_t} h_k x_k\right)^{\dagger} \Lambda^{-1} \left(r - h_1 x_{opt1} - \sum_{k=2}^{M_t} h_k x_k\right). \quad (17)$$

At step 416, the residual error d is used to update tog metrics for all antennas, including k=1. The log metric for antennas for antennas 2 through $M_t$ is given by:

$$L(k, j) = \min_{x_k|b_j=1} d - \min_{x_k|b_j=0} d, \tag{18}$$

and the log metric for antenna 1 is given by:

$$L(1, j) = \min_{x_{opt1}|b_j=1} d - \min_{x_{opt1}|b_j=0} d. \tag{19}$$

As described above in the context of the nearest neighbor search, a "best" value for each transmitted bit (k,j) can be stored for both the $b_j$=0 and $b_j$=1 cases and updated when the current residual distance d is less than the best value. At step 420, it is determined whether more combinations of constellation points remain; if so, the process returns to step 404 to select the next combination.

For each antenna other than the first, all of the constellation points are searched. Accordingly, for these antennas, there is always at least one value of d corresponding to $b_j$=0 and at least one value of d corresponding to $b_j$=1 for every bit $b_j$. For the first antenna, however, it is possible that no value of $x_{opt1}$ will occur having $b_j$=0 (or $b_j$=1) for a particular bit $b_j$. A stuffed constant value S is used to compute L(1,j) for a bit position j where $b_j$=0 does not occur:

$$L(1, j) = \min_{x_{opt1}|b_j=1} d - S, \tag{20}$$

and for a bit position j where $b_j$=1 does not occur:

$$L(1, j) = S - \min_{x_{opt1}|b_j=0} d \tag{21}$$

As described above in the context of the nearest neighbor search, the stuffed constant value S may also be used as an upper bound on d for the first antenna (or for any other antenna). The value of S may be varied as desired; in one embodiment a moderately large value that does not strongly bias the log metric is advantageously chosen.

The bit-stuffing search process 400 involves only one search over all constellation points for every antenna except one. Thus, the complexity of this search is $C^{Mt-1}$, where C is the total number of constellation points and $M_t$ is the number of transmit antennas.

The reduction in complexity is associated with a small performance penalty; in the reference system described above, the penalty is about 2–5 dB. This is comparable to the performance of the nearest neighbor search process 200 described above if the number of neighbor points searched ($N_s$) is larger than C/3; for smaller values of $N_s$, the bit-stuffing search process 400 outperforms the nearest neighbor search process 200.

It will be appreciated that process 400 is illustrative, and that process steps may be modified, varied, or combined. The choice of antenna to be excluded from the search is arbitrary, and the use of index k=1 to denote the excluded antenna is merely a notational convenience. The value of the constant S may be selected as desired, and optimal values depend on the particular implementation of the MIMO communication system in which process 400 is to be used. In an alternative embodiment, fewer than all combinations of constellation points are searched for the included antennas, and the stuffed constant value S may be used to compute L(k,j) for any bit position j where $b_j$=0 or $b_j$=1 does not occur.

Figure 5:
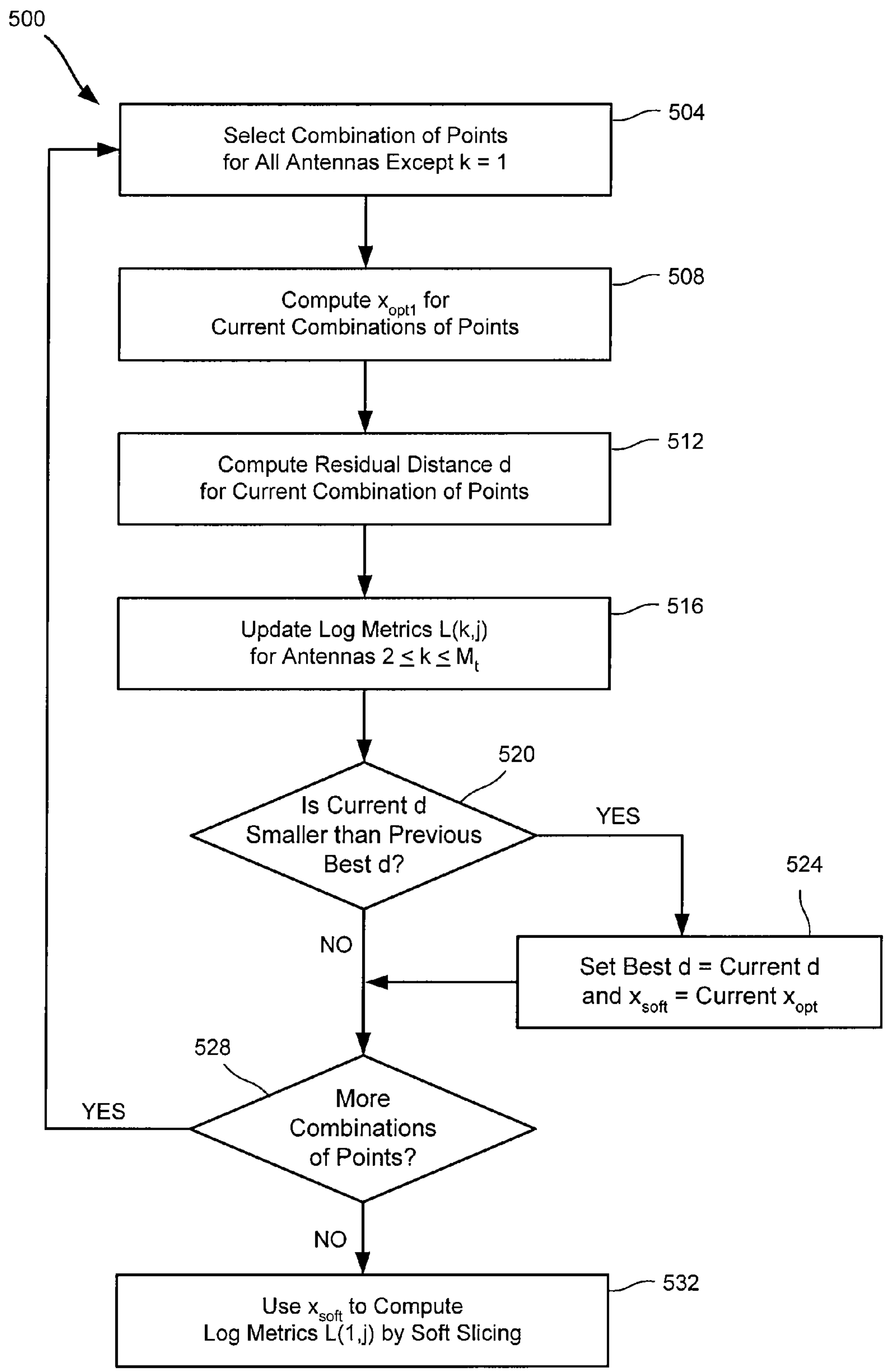
FIG. 5 is a flow chart of a process for soft symbol decoding using soft slicing completion according to yet another embodiment of the present invention.

FIG. 5 illustrates a reduced complexity search process 500 according to yet another embodiment of the present invention. In this embodiment, log map decoder 134 implements a soft-slicing completion algorithm that generates log metrics for all combinations of bit values based on a single search over all possible constellation points for each antenna except one. A "soft slicing" technique is used to determine log metrics for the antenna that is not searched.

More specifically, at step 504, a combination of constellation points $x_k$ for the k−1 antennas numbered 2 through $M_t$ is selected. At step 508, a corresponding value $x_{opt1}$ for the remaining antenna (k=1) is determined using the equation:

$$x_{opt1} = \frac{h_1^*\Lambda^{-1}r - \sum_{k=2}^{M_t} h_1^*\Lambda^{-1}h_k x_k}{h_1^* h_1}. \tag{22}$$

Note that in this embodiment, $x_{opt1}$ is not constrained to be one of the constellation points.

At step 512, a residual distance d is computed using the equation:

$$d = \left(r - h_1\,\text{slice}(x_{opt1}) - \sum_{k=2}^{M_t} h_k x_k\right)^{\dagger}\Lambda^{-1}\left(r - h_1\,\text{slice}(x_{opt1}) - \sum_{k=2}^{M_t} h_k x_k\right). \tag{23}$$

As described above, the slice operation selects the nearest constellation point to $x_{opt1}$ in the Euclidean sense. At step 516, the log metrics are updated for all antennas except k=1. These log metrics can be defined according to equation (18) above, and step 516 of process 500 may be implemented similarly to step 416 of process 400 described above.

For the k=1 antenna, log metrics are computed using a "soft slicing" procedure. First, the value of $x_{opt1}$ for which d is minimized (denoted by $x_{soft}$) is determined. More specifically, at step 520, the residual error d for the current combination is compared to a stored best value of d. If the current value is smaller, then at step 524, the current value of d becomes the new best value of d, and the current value of $x_{opt1}$ is stored as $x_{soft}$.

At step 528, it is determined whether more combinations of constellation points remain to be searched; if so, the process returns to step 504 to select the next combination.

After all combinations of constellation points have been searched, the log metrics for the first antenna are determined at step 532. In this embodiment, the log metrics for the first antenna are computed using the equation:

$$L(1,j)=\text{softslice}(x_{soft}, b_j=1)-\text{softslice}(x_{soft}, b_j=0), \quad (24)$$

where the softslice operation finds the Euclidean distance between $x_{soft}$ and the nearest valid constellation point such that $b_j$ has the specified value (1 or 0). The softslice operation can be implemented in a number of ways; for instance, using techniques known in the art for the 16QAM constellation. In one implementation, the operation is similar to the slicing procedures described above. Distances are found to all four quadrants, and minimum distances satisfying each bit-value criterion are stored for the two most significant bits. The constellation is then shifted, as described above, and the minimum-distance procedure is repeated for the two least significant bits.

Like the bit-stuffing process 400, process 500 requires only one search over all constellation points for every antenna except one. Thus, the complexity of this search is also $C^{Mt-1}$, where C is the total number of constellation points and $M_t$ is the number of transmit antennas. There is also a small additional complexity a associated with the softslice operation that increases linearly with the number of bits per constellation point, but the speed of the search is generally dominated by the number of combinations to be searched. The performance penalty is almost identical to that of the bit-stuffing method.

It will be appreciated that process 500 is illustrative, and that process steps may be modified, varied, or combined. The choice of antenna to be excluded from the search is arbitrary, and the use of k=1 to denote the excluded antenna is merely a notational convenience. Various techniques may be used in the softslice operation to determine the nearest constellation point having the desired bit value.

While the invention has been described with respect to exemplary embodiments, one skilled in the art will recognize that numerous modifications are possible. For example, the search algorithms may be implemented using hardware components, software components, and/or any combination thereof. The exact definition of the log metrics for a particular algorithm may also be varied, e.g., by applying normalization factors. Metrics other than log metrics may also be used. In general, any probability metric that is monotonic with the maximum a posteriori estimate can be used. Metrics generated by any of the algorithms described herein can be used in conjunction with various hard symbol decoding algorithms to generate the output data stream. The invention is also not limited as to the signaling constellation, FEC encoding scheme, or interleaving scheme that may be used.

Additionally, more than one antenna can be excluded from a search. In embodiments described above, a first search determines metrics for every transmit antenna except one; metrics for the excluded antenna are then generated either by using the results from the first search (e.g., bit stuffing or soft-slicing) or by performing a second search (as described in the nearest-neighbor case). In other embodiments, the excluded set might not be limited to one antenna. For instance, for a MIMO system with $M_t$=8, two antennas might be excluded while the other six antennas are searched, with the results of the six-antenna search being used for another search that includes the two excluded antennas. The search over the two excluded antennas could use the same algorithm as the six-antenna search or a different algorithm. Alternatively, instead of the second search, the symbols from the two antennas might be decoded using bit-stuffing.

Thus, although the invention has been described with respect to exemplary embodiments, it will be appreciated that the invention is intended to cover all modifications and equivalents within the scope of the following claims.

What is claimed is:

1. A method for determining soft metrics in a multiple input, multiple output communication system, wherein a number $B^*M_t$ of bits are transmitted in a channel period as $M_t$ symbols in a signaling constellation via a number $M_t$ of transmit antennas to a number $M_r$ of receive antennas, the method comprising:

(a) receiving through the communication channel a signal represented by an $M_r$-dimensional vector r, wherein each component of the vector r corresponds to a signal received by a respective one of the receive antennas;

(b) computing an $M_t$-dimensional vector $x_{sub}$ representing a sub-optimal reconstruction of the transmitted set of symbols;

(c) for each component $x_{sub,k}$ of the vector $x_{sub}$, selecting a corresponding plurality of constellation points to be searched, the plurality of constellation points making up a set $X_k$ of nearest neighbor constellation points, wherein fewer than all of the constellation points in the signaling constellation are included in the set $X_k$;

(d) for a combination of constellation points formed by selecting one of the plurality of nearest neighbor constellation points from the set $X_k$ for each of the transmit antennas k, computing a residual error d using the received signal r and the constellation points in the combination; and (e) computing from the residual error d a metric L(k,j) for a transmitted bit $b_j$ sent by a transmit antenna k.

2. The method of claim 1, wherein step (d) is performed for all combinations of the nearest neighbor constellation points.

3. The method of claim 1, wherein the constellation points in the set $X_k$ are a number $N_s$ of constellation points closest to $x_{sub,k}$ in the Euclidean sense.

4. The method of claim 1, wherein each component of the vector r is represented by a complex number.

5. The method of claim 1, wherein the vector $x_{sub}$ is computed according to the equation $$x_{sub} = \underset{x}{\operatorname{argmin}}[(Qr-x)^{\dagger}(Qr-x)],$$

wherein Q is related to a channel estimate matrix H according to the equation $Q=(H^*H)^{-1}H^*$.

6. The method of claim 5, wherein the residual error d is computed according to the equation $$d=\left(r-\sum_{k=1}^{M_t} h_k\hat{x}_k\right)^{\dagger}\Lambda^{-1}\left(r-\sum_{k=1}^{M_t} h_k\hat{x}_k\right),$$

wherein:

$h_k$ is a vector representing a channel estimate for a transmit antenna k transmitting to each of the receive antennas;

$\Lambda$ is a noise power matrix; and $\hat{x}_k$ is the one of the constellation points in the combination selected from the set $X_k$ for transmit antenna k.

7. The method of claim 6, wherein the metric L(k,j) for the transmitted bit $b_j$ sent by the transmit antenna k is a log metric defined by the equation $$L(k,j)=\min_{\hat{x}_k|b_j=1} d-\min_{\hat{x}_k|b_j=0} d.$$

8. The method of claim 7, wherein a minimum value of the residual error d is constrained to be not larger than a constant value S.

9. The method of claim 8, wherein the number of nearest neighbor constellation points is selected in response to a system operating condition.

10. A method for determining soft metrics in a multiple input, multiple output communication system, wherein a number $B*M_t$ of bits are transmitted in a channel period as $M_t$ symbols in a signaling constellation via a number $M_t$ of transmit antennas to a number $M_r$ of receive antennas, the method comprising:

(a) receiving through the communication channel a signal represented by an $M_r$-dimensional vector r, wherein each component of the vector r corresponds to a signal received by a respective one of the receive antennas;

(b) computing an $M_t$-dimensional vector $x_{sub}$ representing a sub-optimal reconstruction of the transmitted set of symbols;

(c) for each component $x_{sub,k}$ of the vector $x_{sub}$, selecting a corresponding plurality of constellation points to be searched, the plurality of constellation points making up a set $X_k$ of nearest neighbor constellation points, wherein fewer than all of the constellation points in the signaling constellation are included in the set $X_k$;

(d) computing an optimized constellation point $x_{opt1}$ for a first excluded transmit antenna using the received signal r and a combination of constellation points formed by selecting one of the plurality of nearest neighbor constellation points from the set $X_k$ for each of the transmit antennas k other than the first excluded transmit antenna;

(e) computing a residual error d2 using the received signal r, the optimized constellation point $x_{opt1}$, and the constellation points in the combination; and (f) computing from the residual error d2 a metric L(k,j) for a transmitted bit $b_j$ sent by a transmit antenna k other than the first excluded transmit antenna.

11. The method of claim 10, wherein steps (d) and (e) are performed for all combinations of the nearest neighbor constellation points for each of the transmit antennas k other than the first excluded transmit antenna.

12. The method of claim 10, wherein the constellation points in the set $X_k$ are a number $N_s$ of constellation points closest to $x_{sub,k}$ in the Euclidean sense.

13. The method of claim 10, wherein each component of the vector r is represented by a complex number.

14. The method of claim 10, wherein the vector $x_{sub}$ is computed according to the equation $$x_{sub}=\underset{x}{\operatorname{argmin}}[(Qr-x)^{\dagger}(Qr-x)]$$

wherein Q is related to a channel estimate matrix H according to the equation $Q=(H^*H)^{-1}H^*$.

15. The method of claim 14, wherein the optimized constellation point $x_{opt1}$ for the first excluded transmit antenna is computed according to the equation $$x_{opt1}=\text{slice}\left(\frac{h_1^*\Lambda^{-1}r-\sum_{k=2}^{M_t}h_1^*\Lambda^{-1}h_k\hat{x}_k}{h_1^*h_1}\right),$$

wherein:

$h_k$ is a vector representing a channel estimate for a transmit antenna k transmitting to each of the receive antennas;

Λ is a noise power matrix; and $\hat{x}_k$ is the one of the constellation points in the combination selected from the set $X_k$ for transmit antenna k.

16. The method of claim 15, wherein the residual error d2 is computed according to the equation $$d2=\left(r-h_1x_{opt1}-\sum_{k=2}^{M_t}h_k\hat{x}_k\right)^{\dagger}\Lambda^{-1}\left(r-h_1x_{opt1}-\sum_{k=2}^{M_t}h_k\hat{x}_k\right).$$

17. The method of claim 16, wherein the metric L(k,j) for the transmitted bit $b_j$ sent by the transmit antenna k is a log metric defined by the equation $$L(k,j)=\min_{\hat{x}_k|b_j=1} d2-\min_{\hat{x}_k|b_j=0} d2.$$

18. The method of claim 17, wherein a minimum value of the residual error d2 is constrained to be not larger than a constant value S.

19. The method of claim 10, wherein the number of nearest neighbor constellation points is selected in response to a system operating condition.

20. The method of claim 10, further comprising:

(g) computing an optimized constellation point $x_{optM}$ for a second excluded transmit antenna using the received signal r and a combination of constellation points formed by selecting one of the plurality of search points $X_k$ for each of the transmit antennas k other than the second excluded transmit antenna;

(h) computing a residual error d1 using the received signal r, the optimized constellation point $x_{optM}$ and the constellation points in the combination; and (i) computing from the residual error d1 a metric L(1,j) for a transmitted bit $b_j$ sent by the first excluded transmit antenna.

21. The method of claim 20, wherein the optimized constellation point $x_{optM}$ for the second excluded transmit antenna is computed according to the equation $$x_{optM}=\text{slice}\left(\frac{h_{Mt}^*\Lambda^{-1}r-\sum_{k=1}^{M_t-1}h_{Mt}^*\Lambda^{-1}h_k\hat{x}_k}{h_{Mt}^*h_{Mt}}\right),$$

wherein:

$h_k$ is a vector representing a channel estimate for a transmit antenna k transmitting to each of the receive antennas;

$\Lambda$ is a noise power matrix; and $\hat{x}_k$ is the one of the constellation points in the combination selected from the set $X_k$ for transmit antenna k.

22. The method of claim 21, wherein the residual error d1 is computed according to the equation $$d1=\left(r-h_{Mt}x_{optM}-\sum_{k=1}^{M_t-1}h_k\hat{x}_k\right)^{\dagger}\Lambda^{-1}\left(r-h_{Mt}x_{optM}-\sum_{k=1}^{M_t-1}h_k\hat{x}_k\right).$$

23. The method of claim 22, wherein the metric L(1,j) for the transmitted bit $b_j$ sent by the first excluded transmit antenna is a log metric defined by the equation $$L(1,j)=\min_{\hat{x}_1|b_j=1}d1-\min_{\hat{x}_1|b_j=0}d1.$$

24. The method of claim 23, wherein a minimum value of the residual error d1 is constrained to be not larger than a constant value S.

25. A method for determining soft metrics in a multiple input, multiple output communication system, wherein a number $M_t$*B of bits are transmitted in a channel period as $M_t$ symbols in a symbol constellation via a number $M_t$ of transmit antennas to a number $M_r$ of receive antennas, the method comprising:

(a) receiving through the communication channel a signal represented by an $M_r$-dimensional vector r, wherein each component of the vector r corresponds to a signal received by a respective one of the receive antennas;

(b) computing an optimized constellation point $x_{opt1}$ for a first excluded transmit antenna using the received signal r and a combination of constellation points formed by selecting one of a plurality of constellation points $x_k$ for each of the transmit antennas k other than the first excluded transmit antenna;

(c) for each combination of constellation points, computing a residual error d from the received signal r, the optimized constellation point $x_{opt1}$, and the constellation points in the combination;

(d) computing from the residual error d a metric L(k,j) for a transmitted bit $b_j$ sent by a transmit antenna k other than the first excluded transmit antenna; and (e) computing from the residual error d a metric L(1,j) for a transmitted bit $b_j$ sent by the first excluded transmit antenna, wherein a stuffed constant value S is used in the computation in the event that no optimized constellation point $x_{opt1}$ has a specified bit value in the bit position j.

26. The method of claim 25, wherein each component of the vector r is a complex number.

27. The method of claim 25, wherein the optimized constellation point $x_{opt1}$ for the first excluded antenna is computed according to the equation $$x_{opt1}=slice\left(\frac{h_1^*\Lambda^{-1}r-\sum_{k=2}^{M_t}h_1^*\Lambda^{-1}h_kx_k}{h_1^*h_1}\right),$$

wherein:

$h_k$ is a vector representing a channel estimate for a transmit antenna k transmitting to each of the receive antennas; and $\Lambda$ is a noise power matrix.

28. The method of claim 27, wherein the residual error d is computed according to the equation $$d=\left(r-h_1x_{opt1}-\sum_{k=2}^{M_t}h_kx_k\right)^{\dagger}\Lambda^{-1}\left(r-h_1x_{opt1}-\sum_{k=2}^{M_t}h_kx_k\right).$$

29. The method of claim 28, wherein the metric L(k,j) for the transmitted bit $b_j$ sent by the transmit antenna k is defined by the equation $$L(k,j)=\min_{x_k|b_j=1}d-\min_{x_k|b_j=0}d.$$

30. The method of claim 28, wherein the metric L(1,j) for the transmitted bit $b_j$ sent by the first excluded transmit antenna is defined by:

the equation $$L(1,j)=\min_{x_{opt1}|b_j=1}d-\min_{x_{opt1}|b_j=0}d,$$

in the case where $x_{opt1}|b_j=0$ and $x_{opt1}|b_j=1$ both exist;

the equation $$L(k,j)=\min_{x_{opt1}|b_j=1}d-S,$$

in the case where $x_{opt1}|b_j=0$ does not exist; and the equation $$L(k,j)=S-\min_{x_{opt1}|b_j=0}d,$$

in the case where $x_{opt1}|b_j=1$ does not exist.

31. A method for determining soft metrics in a multiple input, multiple output communication system, wherein a number $M_t$*B of bits are transmitted in a channel period as $M_t$ symbols in a symbol constellation via a number $M_t$ of transmit antennas to a number $M_r$ of receive antennas, the method comprising:

(a) receiving through the communication channel a signal represented by an $M_r$-dimensional vector r, wherein each component of the vector r corresponds to a signal received by a respective one of the receive antennas;

(b) computing a residual value $x_{opt1}$ for a first excluded transmit antenna using the received signal r and a combination of constellation points formed by selecting one of a plurality of constellation points $x_k$ for each of the transmit antennas k other than the first excluded transmit antenna;

(c) for each combination of constellation points, computing a residual error d using the received signal r, the residual value $x_{opt1}$, and the constellation points in the combination;

(d) computing from the residual error d a metric L(k,j) for a transmitted bit $b_j$ sent by a transmit antenna k other than the first excluded transmit antenna;

(e) selecting a best residual value $x_{soft}$ that corresponds to a minimum value of the residual error d; and (f) computing from the best residual value $x_{soft}$ a metric L(1,j) for a transmitted bit $b_j$ sent by the first excluded transmit antenna.

32. The method of claim 31, wherein each component of the vector r is a complex number.

33. The method of claim 31, wherein the residual value $x_{opt1}$ is computed according to the equation $$x_{optl} = \frac{h_1^* \Lambda^{-1} r - \sum_{k=2}^{m_t} h_1^* \Lambda^{-1} h_k x_k}{h_1^* h_1},$$

wherein:

$h_k$ is a vector representing a channel estimate for a transmit antenna k transmitting to each of the receive antennas; and Λ is a noise power matrix.

34. The method of claim 33, wherein the residual error d is computed according to the equation $$d = \left(r - h_1 \text{slice}(x_{optl}) - \sum_{k=2}^{M_t} h_k x_k\right)^{\dagger} \Lambda^{-1} \left(r - h_1 \text{slice}(x_{optl}) - \sum_{k=2}^{M_t} h_k x_k\right).$$

35. The method of claim 34, wherein the metric L(k, j) for the transmitted bit $b_j$ sent by the transmit antenna k is defined by the equation $$L(k, j) = \min_{x_k | b_j = 1} d - \min_{x_k | b_j = 0} d.$$

36. The method of claim 35, wherein the metric L(1,j) for the transmitted bit $b_j$ sent by the first excluded transmit antenna is defined by the equation L(1,j)=softslice($x_{soft}$, $b_j$=1)−softslice($x_{soft}$, $b_j$=0), wherein softslice is an operation that determines the Euclidean distance between a best residual value $x_{soft}$ and the nearest valid constellation point such that the transmitted bit $b_j$ has the specified value.

37. A method for determining soft metrics in a multiple input, multiple output communication system, wherein a number B*$M_t$ of bits are transmitted in a channel period as $M_t$ symbols in a signaling constellation via a number $M_t$ of transmit antennas, where $M_t$ is at least 4, to a number $M_r$ of receive antennas, the method comprising:

(a) receiving through the communication channel a signal represented by an $M_r$-dimensional vector r, wherein each component of the vector r corresponds to a signal received by a respective one of the receive antennas;

(b) computing an $M_t$-dimensional vector $x_{sub}$ representing a sub-optimal reconstruction of the transmitted set of symbols, where $M_t$ is at least 4;

(c) for each component $x_{sub,k}$ of the vector $x_{sub}$, selecting a corresponding plurality of constellation points to be searched, the plurality of constellation points making up a set $X_k$ of nearest neighbor constellation points, wherein fewer than all of the constellation points in the signaling constellation are included in the set $X_k$;

(d) computing a residual value $x_{opt}$ for at least one excluded transmit antenna using the received signal r and a combination of constellation points formed by selecting one of the plurality of constellation points from the set $X_k$ for each of the transmit antennas k other than the at least one excluded transmit antenna;

(e) for each combination of constellation points, computing a residual error d2 using the received signal r, the residual value $x_{opt}$, and the constellation points in the combination; and (f) computing from the residual error d2 a metric L(k,j) for a transmitted bit $b_j$ sent by a transmit antenna k other than the at least one excluded transmit antenna.

38. A method for determining soft metrics in a multiple input, multiple output communication system, wherein a number $M_t$*B of bits are transmitted in a channel period as $M_t$ symbols in a symbol constellation via a number $M_t$ of transmit antennas, where $M_t$ is at least 4, to a number $M_r$ of receive antennas, the method comprising:

(a) receiving through the communication channel a signal represented by an $M_r$-dimensional vector r, wherein each component of the vector r corresponds to a signal received by a respective one of the receive antennas;

(b) computing a residual value $x_{opt}$ for at least one excluded transmit antenna using the received signal r and a combination of constellation points formed by selecting one of a plurality of constellation points $x_k$ for each of the transmit antennas k other than the at least one excluded transmit antenna;

(c) for each combination of constellation points, computing a residual error d from the received signal r, the residual value $x_{opt}$, and the constellation points in the combination;

(d) computing from the residual error d a metric L(k,j) for a transmitted bit $b_j$ sent by a transmit antenna k other than the at least one excluded transmit antenna; and (e) computing from the residual error d a metric L(1,j) for a transmitted bit $b_j$ sent by one of the at least one excluded transmit antenna, wherein a stuffed constant value S is used in the computation in the event that no optimized constellation point $x_{opt1}$ has a specified bit value in the bit position j.

39. A method for determining soft metrics in a multiple input, multiple output communication system, wherein a number $M_t$*B of bits are transmitted in a channel period as $M_t$ symbols in a symbol constellation via a number $M_t$ of transmit antennas, where $M_t$ is at least 4, to a number $M_r$ of receive antennas, the method comprising:

(a) receiving through the communication channel a signal represented by an $M_r$-dimensional vector r, wherein each component of the vector r corresponds to a signal received by a respective one of the receive antennas;

(b) computing a residual value $x_{opt}$ for at least one excluded transmit antenna using the received signal r and a combination of constellation points formed by selecting one of a plurality of constellation points $x_k$ for each of the transmit antennas k other than the at least one excluded transmit antenna;

(c) for each combination of constellation points, computing a residual error d using the received signal r, the residual value $x_{opt}$, and the constellation points in the combination;

(d) computing from the residual error d a metric L(k,j) for a transmitted bit $b_j$ sent by a transmit antenna k other than the at least one excluded transmit antenna;

(e) selecting a best residual value $x_{soft}$ that corresponds to a minimum value of the residual error d; and (f) computing from the best residual value $x_{soft}$ a metric L(1,j) for a transmitted bit $b_j$ sent by one of the at least one excluded transmit antenna.

* * * * *